United States Patent
Holmen et al.

(10) Patent No.: US 9,915,387 B2
(45) Date of Patent: Mar. 13, 2018

(54) SYSTEM AND METHOD FOR MANUFACTURING ELECTRICALLY ISOLATED CONNECTION FOR ELECTROMAGNETIC GAP SUB ASSEMBLY

(71) Applicants: Garry Holmen, Calgary (CA); Jeff Payne, Grand Prairie, TX (US)

(72) Inventors: Garry Holmen, Calgary (CA); Jeff Payne, Grand Prairie, TX (US)

(73) Assignee: MULTI-SHOT LLC, Conroe, TX (US)

( * ) Notice: Subject to any disclaimer, the term of this patent is extended or adjusted under 35 U.S.C. 154(b) by 1157 days.

(21) Appl. No.: 14/077,950

(22) Filed: Nov. 12, 2013

(65) Prior Publication Data
US 2014/0131994 A1 May 15, 2014

Related U.S. Application Data

(60) Provisional application No. 61/725,224, filed on Nov. 12, 2012.

(51) Int. Cl.
*F16L 25/02* (2006.01)

(52) U.S. Cl.
CPC ....... *F16L 25/021* (2013.01); *Y10T 29/49826* (2015.01)

(58) Field of Classification Search
CPC ...................................................... F16L 15/08
USPC ..................... 285/92, 294.3, 294.4, 333, 334
See application file for complete search history.

(56) References Cited

U.S. PATENT DOCUMENTS

| | | | | |
|---|---|---|---|---|
| 2,296,198 | A | * | 9/1942 | Boynton ............... E21B 17/046 285/334 |
| 4,693,498 | A | * | 9/1987 | Baugh ................... E21B 17/043 285/92 |
| 4,861,074 | A | * | 8/1989 | Eastlund ............... E21B 17/003 285/294.4 |
| 5,110,158 | A | * | 5/1992 | Sabo ...................... F16B 7/0426 285/92 |
| 5,215,336 | A | * | 6/1993 | Worthing .............. F16L 19/005 285/92 |
| 5,785,357 | A | * | 7/1998 | Foster ..................... F16L 15/08 285/92 |
| 6,860,514 | B2 | * | 3/2005 | Wentworth ............. E21B 17/04 285/92 |
| 6,916,248 | B1 | * | 7/2005 | Burgess .................. E21B 17/02 285/92 |

(Continued)

FOREIGN PATENT DOCUMENTS

CA 2535372 A1 * 3/2005 .............. F16L 15/08

*Primary Examiner* — David Bochna
(74) *Attorney, Agent, or Firm* — Winstead PC

(57) ABSTRACT

A gap sub assembly and methods for using the gap sub provide an electrical isolating joint that is mechanically strong enough to withstand the rigors of drilling environments, resistant to environmental effects (heat, corrosive liquids and gases, and high pressures), and maintainable. The gap sub assembly provides a male member and a female member that may be connected together, wherein a non-conductive material is applied between the two at the attachment points. A locking ring or collar affixes to both male and female members to prevent back off while drilling and preserving the electrical isolation of the gap joint. Non-conductive material may be injected between the locking ring and one or more of the male or female members.

8 Claims, 3 Drawing Sheets

(56) References Cited

U.S. PATENT DOCUMENTS

| | | | | |
|---|---|---|---|---|
| 7,434,848 B2 * | 10/2008 | Boyd | ............... | F16L 15/08 |
| | | | | 285/334 |
| 7,784,834 B2 * | 8/2010 | Yater | ............... | E21B 21/02 |
| | | | | 285/92 |
| 8,555,765 B2 * | 10/2013 | Graham, II | ......... | F41A 21/325 |
| | | | | 285/92 |

* cited by examiner

SYSTEM AND METHOD FOR MANUFACTURING ELECTRICALLY ISOLATED CONNECTION FOR ELECTROMAGNETIC GAP SUB ASSEMBLY

RELATED APPLICATIONS

This application claims the benefit of U.S. Provisional Patent Application No. 61/725,224 to Holmen et al. filed on Nov. 12, 2012, which is incorporated herein by reference.

FIELD OF THE INVENTION

This invention relates to electrically isolating a connection in a drilling assembly and more specifically to an improved insulated gap sub-assembly.

BACKGROUND OF INVENTION

Modern drilling techniques employ sensors downhole and broadcast this sensor information to surface using Measurement While Drilling (MWD) telemetry. One variety of MWD telemetry, Electromagnetic (EM) telemetry, sends data to the surface using low frequency radio waves generated by producing a voltage across an insulated gap sub in a drill string or assembly. In EM telemetry applications, a carrier signal is produced by applying an alternating voltage across the insulating gap or electrical isolation in the drill string. This mechanism responsible for providing the insulated gap or electrical isolation may be referred to in the art as a gap sub-assembly or gap sub. As such, the terms insulated gap, isolation sub, and gap sub may be used interchangeably herein. This EM carrier signal can be received at the surface and decoded as EM telemetry, or it can be broadcast into a formation and measured to determine EM resistivity.

An electrical isolation or gap sub must be robust and predictable, as well as, provide high mechanical strength in various drilling environments and drilling conditions. This has been difficult to obtain simultaneously in a gap sub.

An improved gap sub assembly and method for making the gap sub provide a low cost, high strength, easily maintainable and reliable isolation sub to be used as a downhole gap sub assembly.

SUMMARY OF THE INVENTION

The following discussion is provided for the purpose of illustration. It will be recognized that the embodiments are non-limiting examples, and the invention is in no way limited to the specific examples discussed.

In one embodiment, a gap sub provides first and second members that are tubulars. The first member has a connecting end, and the second member has a connecting end that may be coupled to the first member. The gap sub further provides a locking ring that may be made of conductive or non-conductive material. In some embodiments, the locking ring may slide over the second component and mate its anti-torsion features to the anti-torsion features of said second component. Further, the connecting end of first component may provide anti-torsion features that mate to additional anti-torsion features of the locking ring. In some embodiments, the gap between the components of the gap sub may be filled with an electrical isolation material. For example, in some embodiments, the electrical isolation material may be an epoxy, plastic, resin, any other suitable material, or a combination thereof.

In yet another embodiment, multiple rings could be utilized with each ring mating to the anti-torsion features of an adjacent ring. In yet another embodiment, the locking ring may be affixed to the first component with an adhesive or by mechanical welding procedure. In yet another embodiment, the locking ring could be affixed to the first component with one or more anti-torque pins or other mechanical fixtures.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
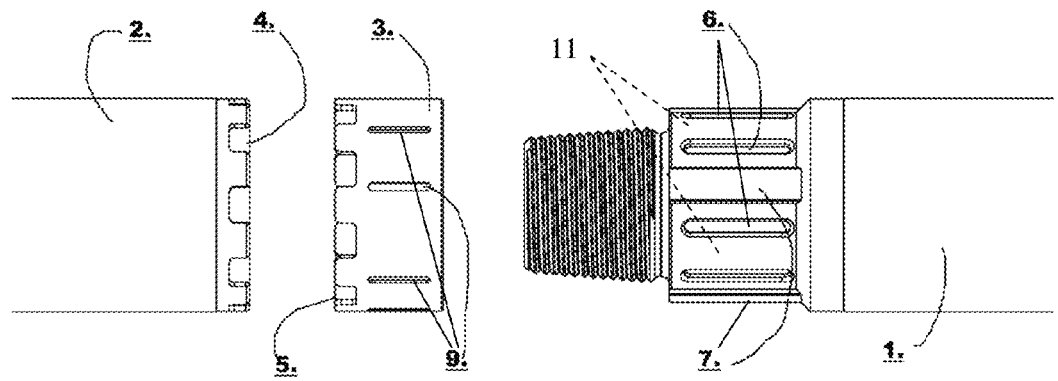
FIG. 1 is an illustrative embodiment of an exploded view of the components of a gap sub.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

A gap sub may provide a male component, female component, and locking ring. A male component may provide a male connection that allows the male and female component to be coupled together. The male and female components may be tubulars for a drill string or drilling tool. As the male and female tubular components may be formed from a conductive material, it is necessary to provide electrical isolation between the components to provide a proper gap sub assembly. The female component may provide a female connection that receives the male connection to allow the male and female components to be coupled together. For example, the male and female components may be threaded, provide press fit connections, or any other suitable coupling means. In some embodiments, the male component may provide one or more receiving slots for receiving a locking ring. In other embodiments, the female component may provide one or more receiving slots for receiving a locking ring. These receiving slots may also function as anti-torsion features.

In some embodiments, anti-torsion features may be provided on the male component, female component, locking ring, or combinations thereof. Anti-torsion or anti-rotation features are structural features provided on two or more components to prevent or minimize rotation of the components relative to each other. In some embodiments, the anti-torsion features may be one or more castellation(s) and slot(s) receiving the castellations, spline(s) and groove(s) receiving the spline(s), or the like. The anti-torsion features may be positive or negative. Positive anti-torsion features may be raised portions of a surface, and negative anti-torsion features may be depressed portions of a surface. For example, grooves are a nonlimiting example of negative anti-torsion features, and splines are a nonlimiting example of positive anti-torsion features. When coupled or mated together, these positive and negative anti-torsion features come into contact and prevent further rotation when one or more of the two components are rotated. Spacing between a positive and negative anti-torsion feature may be utilized to set the amount of rotation allowed. Any combination of positive and negative features may be utilized.

A locking ring serves to transfer torque exerted on the male or female component to the other component, which prevents decoupling of the components. In some embodiments, a locking ring may provide one or more anti-torsion features, such as castellations, that fit into receiving anti-torsion features, such as castellation slots, of the female component. By mating the anti-torsion features of the locking ring to the female component, both the locking ring and female component must rotate together. In some embodiments, the male component may provide one or more anti-torsion features, such as receiving slots or relief grooves, for receiving anti-torsion features of a locking ring, such as splines. In another embodiment, multiple locking rings may be provided, such as two or more locking rings. For example, a first locking ring may provide anti-torsion features that mate with the female component, and a second locking ring may provide anti-torsion features that mate with the male component. Each of the multiple locking rings may also provide additional anti-torsion features that mate with the anti-torsion features of another locking ring. In embodiments with two locking rings, these first and second locking rings may each provide additional anti-torsion features that mate the other locking ring's anti-torsion features. In other embodiment with more than two locking rings, each locking ring's anti-torsion features may successively mate with the anti-torsion feature of an adjacent locking ring.

Further, the one or more anti-torsion features may be provide on an interior surface of a lock ring, such as the anti-torsion features that mate with the male component. By mating these anti-torsion features of the locking ring to the male component, both the locking ring and male component will rotate together when the features are in contact. In some embodiments, the anti-torsion features may be one or more castellation(s) and slot(s) receiving the castellations, spline(s) and groove(s) receiving the spline(s), or the like. In other embodiments, the interior surface of a lock ring may provide one or more anti-torsion features that mate with the female component.

In a non-limiting example, a female component may provide slots that receive castellations provided by a locking ring and/or vice versa. In some embodiments, these anti-torsion features may be one or more castellation(s) and/or slot(s) receiving the castellations, spline(s) and/or groove(s) receiving the spline(s), or the like. In other embodiments, any other suitable mechanical features may be utilized as anti-torsion features. By mating these anti-torsion features of the female component and the locking ring, both the locking ring and female component will rotate together when the features are in contact. In some embodiments, a combination of anti-torsion features may be utilized in the gap sub assembly. For example, a mix of castellations/slots and grooves/splines may be provided on a male/female component and the locking ring.

In some embodiments, electrical isolation material may be positioned between one or more components of the gap sub, such as the male component, female component, locking ring, or a combination thereof. For example, the male component, female component, and/or locking ring may be coated with electrical isolation material prior to assembly, or the electrical isolation material may be injected between the components of the gap sub during assembly and allowed to harden. As a non-limiting example, the threaded connecting portions of the male and female components may be covered with a non-conductive coating; all of the components of the gap sub may be covered with a non-conductive coating; or any other combination of components of the gap sub may be covered with a non-conductive material. In some embodiments, one or more surfaces each gap sub component may be coated with an electrical isolation material. The electrical isolation material or non-conductive coating may be a non-conductive material, such as a ceramic, epoxy, plastic, resin, any other suitable material, or a combination thereof. In some embodiments, an electrical isolation material may be injected between the components of the gap sub to provide electrical isolation and/or to secure the components together, such as between the threaded portions of the male and female components and between the locking ring and/or the male or female components. As an example, electrical isolation material may be injected into an annular region between male component and locking ring and/or between the threaded regions of male and female components. In some embodiments, the locking ring may be a conductive material. However, in other embodiments the locking ring may be a non-conductive material. In embodiments with a non-conductive locking ring, it should be apparent that locking ring may be designed so that injection electrical isolation material may not be necessary. However, in some embodiments, a non-conductive locking ring may be coated with electrical isolation material for other reasons, such as to secure locking ring in position.

When the male component, female component, and the locking ring are all mated together, the gap sub acts single device in which one component cannot be rotated without rotating the entire gap sub. For example, when torque is applied to the female component, the torque is transferred to the locking ring via the anti-torsion features, which transfer the torque to the male component via the anti-torsion features of the locking ring and male component. When torque is applied to the male component, the torque is transferred to the locking ring via the anti-torsion features, which transfers the torque to the female component via the anti-torsion features of the locking ring and female component. As a result of this arrangement, the torque applied to non-conductive material between can be greatly reduced, thereby minimizing potential damage to the non-conductive material.

In some embodiments, the locking ring arrangement may be reversed. For example, castellations or slots of the locking ring may mate with castellations or slots provided on the male component; and the grooves or splines of the locking ring may mate with the female component. In some embodiments, the arrangement of the gap sub may be reversed to allow for incorporation of the locking ring in the interior portion of the male and female components. For example, the male component may have an extended mandrel and the female component having sufficient annular space to allow the locking ring to pass inside it and lock the female component to the male component from the interior of the gap sub. As another example, the castellations could be placed on the male component instead of the female component. In some embodiments, the locking ring may be incorporated with or physically attached to the male component or female component. It will be recognized by one of ordinary skill in the art that several of the various embodiments discussed herein may be reversed and/or modified.

Figure 2:
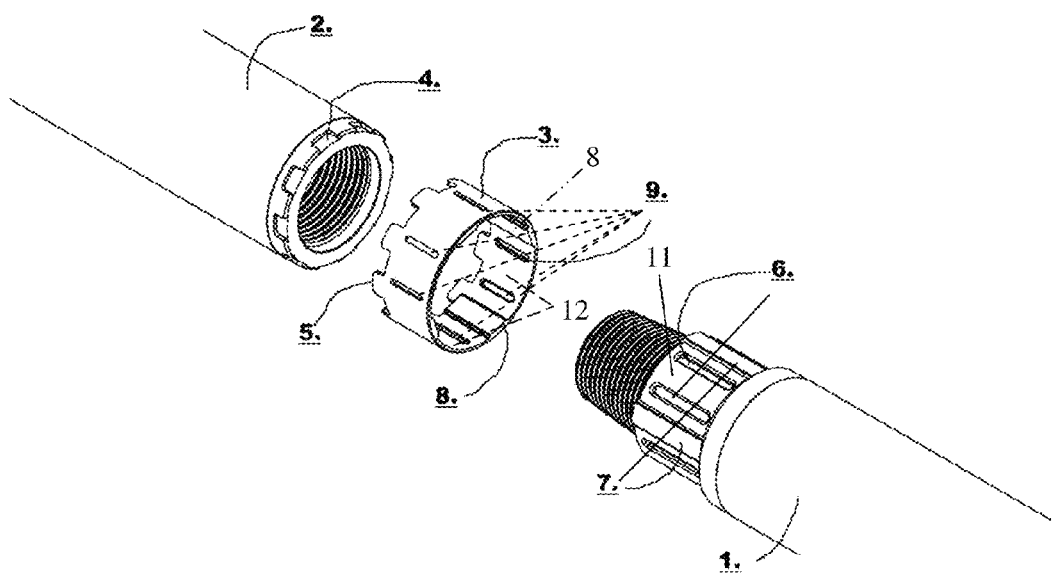
FIG. 2 is an illustrative embodiment of an isometric view of the components of a gap sub.

FIG. 1 is an illustrative embodiment of a gap sub. FIG. 2 is an isometric view of components of a gap sub. For the purpose of clarity an isolation material is not shown. A male component (1), female component (2) and locking ring (3) component may all be made out of conductive material. However, in some embodiments, locking ring (3) may be a non-conductive material. Further, one or more of the surfaces of the male component (1), female component (2), and locking ring (3) that mate together may be coated with a non-conductive ceramic coating to prevent electric conductivity between male component (1) and female component (2). For example, the threaded connecting ends of male component (1) and female component (2) may be coated with a non-conductive material. Further, in some embodiments, locking ring (3) may be coated with a non-conductive material. The locking ring (3) may slide onto the male component (1). A portion of the external surface of the male component (1) near its connecting end may provide alternating relief surfaces (11) or grooves that provide wide depressed areas and splines (7) that provided raised surface portions. An internal surface of the locking ring (3) may provide alternating grooves (12) and splines (8). The grooves (12) provide depressed areas, and the splines (8) provide raised areas that reduce the diameter of the locking ring (3).

As shown, the anti-torsion features utilized by the locking ring (3) are grooves (12) and splines (8) provided on the internal diameter of locking ring (3) that mate with grooves (11) and splines (7) provided on the external diameter of male component (1). Grooves (12) receive splines (7) and grooves (11) receive splines (8). In some embodiments, grooves (11, 12) are wider than splines (7, 8) to allow for limited rotation between the male component (1) and locking ring (3). For example, when male component (1) or locking ring (3) is rotated a predetermined amount (e.g. approximately 90 degrees), the splines (7, 8) come into contact and prevent further rotation.

In some embodiments, the splines and grooves on the male component and locking ring are spaced to prevent rotation of 90 degrees or more. In some embodiments, the splines and grooves on the male component and locking ring are spaced to prevent rotation of 180 degrees or more. In some embodiments, the splines and grooves on the male component and locking ring are spaced to prevent rotation of 270 degrees or more. In some embodiments, the splines and grooves on the male component and locking ring are spaced to prevent rotation of 360 degrees or more.

Electrical isolation material (not shown) may be applied to the female component threads and to the male component threads. For example, the isolation material may be an epoxy, ceramic, plastic, resin, any other suitable material or a combination thereof. The isolation material may be allowed to cure or harden if necessary.

Figure 3:
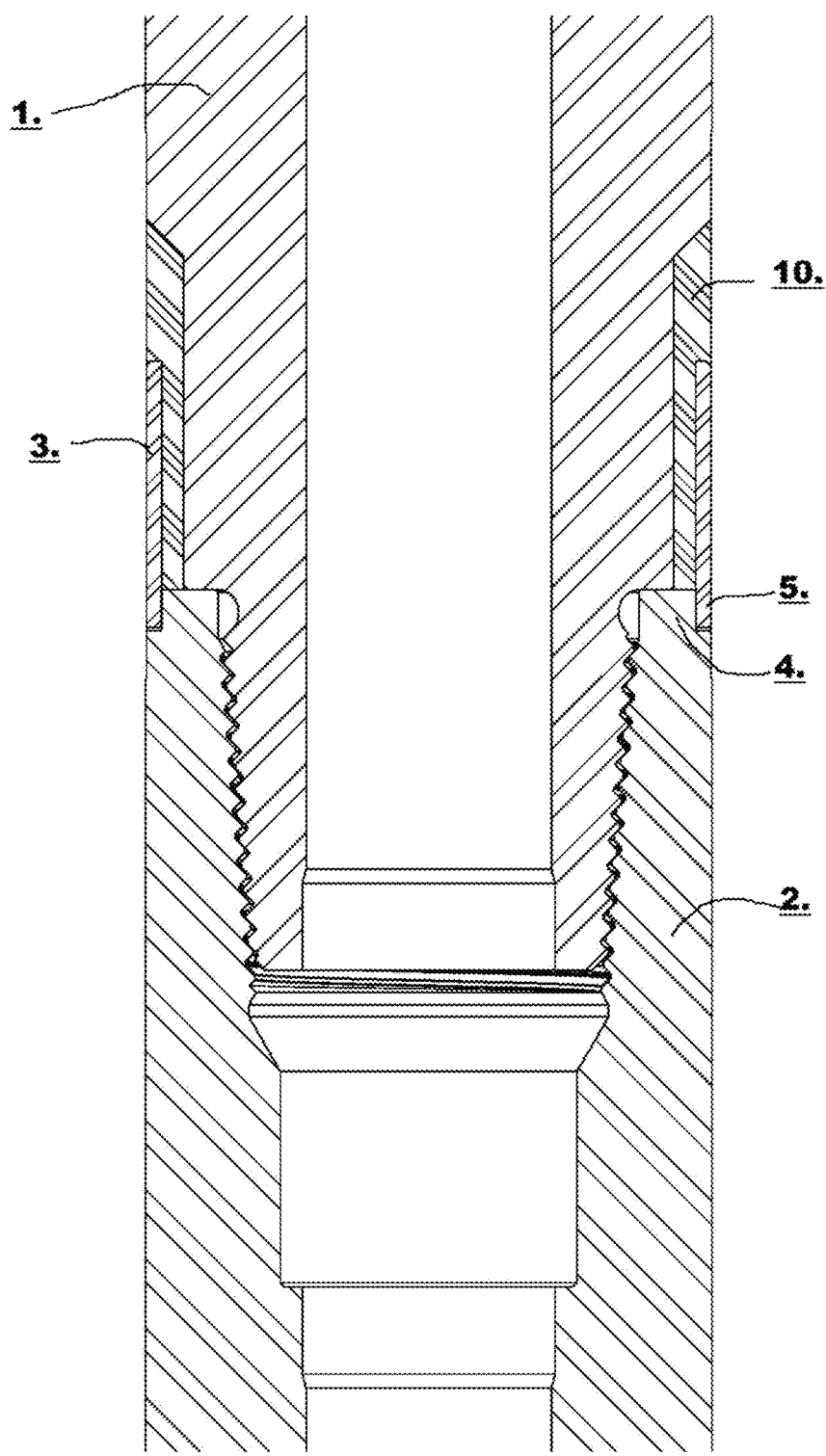
FIG. 3 is an illustrative embodiment of a cross-sectional view of a gap sub.
Figure 4:
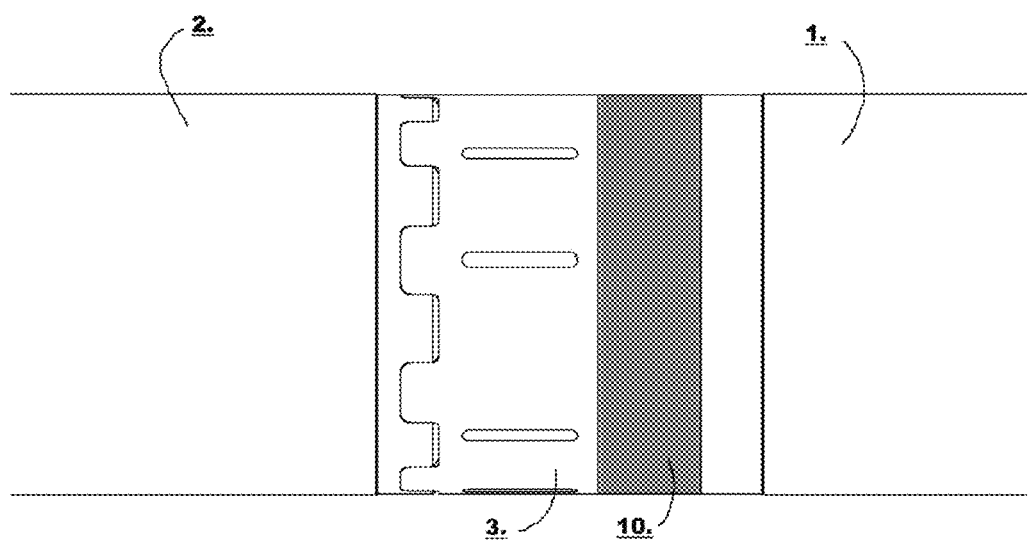
FIG. 4 is an illustrative embodiment of an exterior view of an assembled gap sub.

FIG. 3 is a cross-sectional view of an assembled gap sub, and FIG. 4 shows an external view of a gap sub with isolation material shown. The male (1) and female (2) components may be torque together under a high load. After threading male (1) and female (2) components and prior to curing the isolation material, the locking ring (3) may still be free to move (e.g. to slide up and down or rotate a limited amount) on the male component. In the embodiments shown, the anti-torsion features utilized to prevent rotation between the female component (2) and locking ring (3) are castellations. The castellations provide alternating extended portions and slots. Castellations on locking ring (3) will be referred to herein as locking ring castellations (5), and castellations on female component (2) will be referred to as castellation slots (4) for the purpose of clarity. In some embodiments, the castellation slots (4) are provided on a portion of the external surface near the connecting end of the female component (2). In some embodiments, the locking ring castellations (5) are provided on one end of locking ring (3).

The limited movement of locking ring (3) when male (1) and female (2) components are connected allows it to slide or rotated as necessary to mate locking ring castellations (5) to engage castellations slots (4) of the female component (2) prior to injection and curing of the isolation materials. In some embodiments, temporary spacer(s) made of non-conductive material (e.g. a plastic such as PEEK) may be utilized to keep locking ring (3) locked in position and centralized in engagement with female component (2). The annular gap between the male component (1) and locking ring (3) may be filled with a non-conductive material (10). For example, the non-conductive material may be a ceramic, epoxy, plastic, resin, any other suitable material, or the like. A non-limiting example may be a Zenite material with glass fibre. After injection, the non-conductive material may be cured or allowed to harden if necessary. Once hardened, the non-conductive material (10) locks the locking ring (3) in position relative to male component (1) and female component (2). The non-conductive coating (not shown) on the threaded ends of the male (1) and female (2) components and the non-conductive material (10) provide electrical isolation between the male component (1) and female component (2). These abovementioned steps will interlock the male (1), female (2) and locking ring (3) components with an electrical isolation material (10) in a manner that causes the entire gap sub to act like one complete member with electrically isolated ends.

In some embodiments, additional anti-rotation features on the locking ring and male component relief surface (11) can optionally be added to increase torsion resistance if desired. In some embodiments, each of the relief surfaces (11) of the male component (1) may provide one or more depressions (6) that may be filled by non-conductive material (10) that in injected and cured. In some embodiments, locking ring (3) may provide one or more slots (9) through the ring that may be filled by the non-conductive material (10). When electrical isolation material (10) is injected and cured, the hardened electrical isolation material fills these anti-rotation features (6, 9) to provide further torsion resistance.

This design has advantages over existing designs as follows:

Ease of assembly and manufacturing: As the male and female ends are epoxied together there is no complicated isolation mandrel required to transport the gap sub to a location for it to be filled. Multiple gap subs can be prepared for transport and injection at one time.

The locking ring has a two-fold purpose: It resists torsion and torque that would allow for the connection to back off, and since it can be made from a conductive material, it can also act as a wear protection surface preventing or minimizing the electrical isolation material from being eroded by the drilling environment. Some non-conductive materials utilized to isolate ends of a gap sub may be brittle, thereby providing poor wear and fast erosion in drilling environments. However, the locking ring may be formed from materials with good wear and erosion properties. As a non-limiting example, a locking ring may be made from steel.

The various anti-rotation features can be made as long as needed to increase mechanical strength and anti-torque capabilities. Further, the anti-rotation features can be shaped to increase mechanical strength and anti-torque capabilities. The design is not limited to providing the various anti-torsion or anti-rotation at or near the threading surfaces of the male and female components of the gap sub. Theoretically, a gap sub could be created that could exceed any force seen in the drilling market and be "unbreakable" at the gap joint.

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure.

What is claimed is:

1. A gap sub assembly comprising:
a first tubular component having a first connecting end, wherein the first connecting end has a first set of anti-torsion features;
a second tubular component having a second connecting end coupled to the first connecting end, wherein the second connecting end has a second set of anti-torsion features;
a locking ring coupled to the first and second tubular components near the first and second connecting ends, wherein the locking ring has a third and fourth set of anti-torsion features, the third set of anti-torsion features mating with the first set of anti-torsion features to minimize rotation of the first tubular component relative to the locking ring, and the fourth set of anti-torsion features mating with the second set of anti-torsion features to minimize rotation of the second tubular component relative to the locking ring; and
a non-conductive material is positioned in an annular space between the second tubular component and the locking ring, wherein the non-conductive material also coats the first and second connecting ends, and the non-conductive material electrically isolates the second tubular component from the first tubular component.

2. The gap sub assembly of claim 1, wherein the non-conductive material is a ceramic, epoxy, plastic, resin, Zenite material with glass fibre, or a combination thereof.

3. The gap sub assembly of claim 1, wherein the first set of anti-torsion features are provided on an external surface of the first tubular component near the first connecting end.

4. The gap sub assembly of claim 1, wherein the second set of anti-torsion features are provided on an external surface of the second tubular component near the second connecting end.

5. The gap sub assembly of claim 1, wherein the third set of anti-torsion features are provided at a first end of the locking ring.

6. The gap sub assembly of claim 1, wherein the fourth set of anti-rotation features are provided on an internal surface of the locking ring.

7. The gap sub assembly of claim 1, wherein the locking ring is comprised of multiple rings that interlock together.

8. The gap sub assembly of claim 1, wherein the first set of anti-torsion features of the first tubular component and the third set of anti-torsion features of the locking ring prevent rotation of 270 degrees or more when mated.

* * * * *